(12) United States Patent
Janssen

(10) Patent No.: US 10,184,098 B2
(45) Date of Patent: Jan. 22, 2019

(54) WOODEN VESSEL FOR THE AGING OF LIQUID

(71) Applicant: Ryan Patrick Janssen, Leesburg, VA (US)

(72) Inventor: Ryan Patrick Janssen, Leesburg, VA (US)

( * ) Notice: Subject to any disclaimer, the term of this patent is extended or adjusted under 35 U.S.C. 154(b) by 252 days.

(21) Appl. No.: 15/229,436

(22) Filed: Aug. 5, 2016

(65) Prior Publication Data

US 2018/0037859 A1    Feb. 8, 2018

(51) Int. Cl.
   *C12H 1/22*    (2006.01)
   *C12G 3/07*    (2006.01)

(52) U.S. Cl.
   CPC ............... *C12H 1/22* (2013.01); *C12G 3/065* (2013.01)

(58) Field of Classification Search
   CPC .................................. C12H 1/22; C12G 3/065
   USPC ..... 220/4.09, 209, 265, 790; 217/91, 72, 65; 426/86; 99/277
   See application file for complete search history.

(56) References Cited

U.S. PATENT DOCUMENTS

| | | | | |
|---|---|---|---|---|
| 1,890,597 A | * | 12/1932 | Bishop | B65D 9/34 217/91 |
| 1,978,811 A | * | 10/1934 | Muller | B65D 9/04 217/88 |
| 2,079,378 A | * | 5/1937 | Mills | C12G 3/065 99/277.1 |
| 2,289,245 A | * | 7/1942 | Dant | C12G 3/065 217/3 CB |
| 3,106,885 A | * | 10/1963 | Kelley | C12H 1/22 99/277.1 |
| 3,372,633 A | * | 3/1968 | Horlander, Jr. | B65D 25/14 426/398 |
| 3,456,827 A | * | 7/1969 | Wakeem | B65D 9/04 217/72 |
| 3,462,038 A | * | 8/1969 | Morris | B65D 9/34 217/72 |
| 3,842,723 A | * | 10/1974 | Boucher | B65D 9/04 99/277.1 |
| 4,093,099 A | * | 6/1978 | Spooner | B65D 9/06 217/12 R |
| 4,484,688 A | * | 11/1984 | Smith | B65D 9/06 144/353 |
| 4,558,639 A | * | 12/1985 | Hojnoski | C12G 3/065 426/15 |
| 4,813,565 A | * | 3/1989 | Croser | B65D 15/02 217/88 |
| 4,963,353 A | * | 10/1990 | Sidhu | A61K 8/987 424/195.15 |
| 4,998,643 A | * | 3/1991 | Pradel | B65D 45/32 220/320 |
| 5,174,461 A | * | 12/1992 | Sullivan | B65D 7/045 217/3 CB |

(Continued)

*Primary Examiner* — Nina Bhat

(57) ABSTRACT

A uniquely designed rectangular vessel has been developed for storing and aging liquids—commonly wine and spirits. Its economical and simplistic design offers significant benefits over the use of traditional barrels and other previously proposed arts. Constructed from wood (generally oak), its inner surfaces have been modified to maximize end grain exposure thus significantly reducing the required aging period. In addition, this vessel's inner surface area to volume ratio (directly related to the wood's extraction concentration within the liquid) can be adjusted to meet the user's specific needs.

3 Claims, 5 Drawing Sheets

(56) References Cited

U.S. PATENT DOCUMENTS

| | | | | |
|---|---|---|---|---|
| 5,537,913 | A * | 7/1996 | Vowles | C12G 1/02 |
| | | | | 426/11 |
| D476,058 | S * | 6/2003 | Norton | D23/209 |
| 7,240,609 | B2 * | 7/2007 | Berecz | B27H 5/02 |
| | | | | 99/277.1 |
| 7,762,179 | B2 * | 7/2010 | Eustis | C12H 1/16 |
| | | | | 99/277.1 |
| 8,381,926 | B2 * | 2/2013 | Kenealy | B65D 9/04 |
| | | | | 217/72 |
| 8,689,678 | B2 * | 4/2014 | Eustis | C12H 1/22 |
| | | | | 217/4 |
| 8,889,206 | B2 * | 11/2014 | Lix | B24C 1/04 |
| | | | | 217/88 |
| 9,032,864 | B2 * | 5/2015 | Roleder | C12G 3/065 |
| | | | | 261/87 |
| 9,212,343 | B1 * | 12/2015 | Karasch | C12G 3/065 |
| 9,885,010 | B2 * | 2/2018 | Karasch | C12G 3/065 |
| 2005/0031760 | A1 * | 2/2005 | Plumb | C12G 3/065 |
| | | | | 426/592 |
| 2007/0000929 | A1 * | 1/2007 | Fernandez | B65D 15/22 |
| | | | | 220/565 |
| 2017/0327778 | A1 * | 11/2017 | Karasch | C12G 3/065 |

* cited by examiner

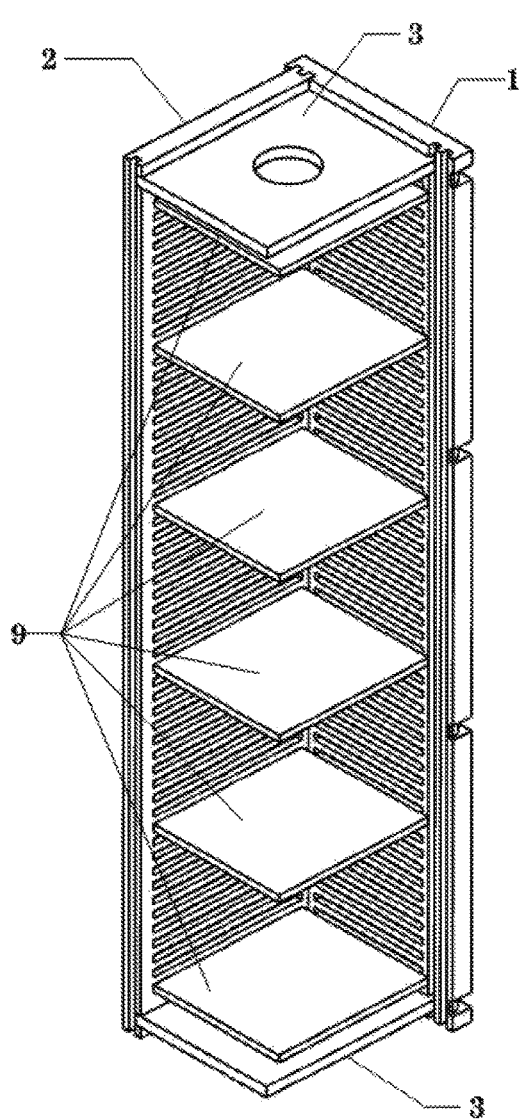
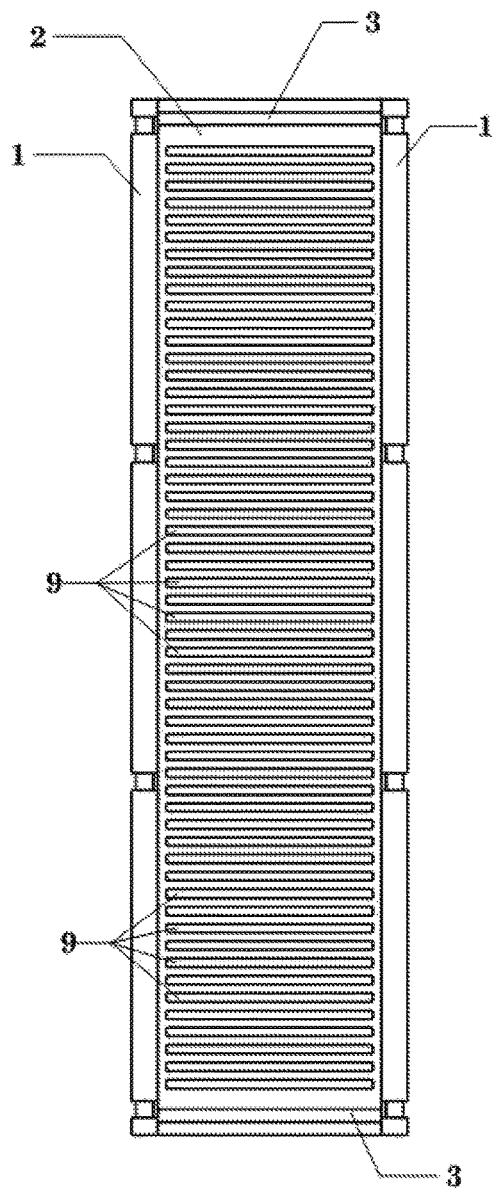
FIG. 8
FIG. 9

WOODEN VESSEL FOR THE AGING OF LIQUID

BACKGROUND

The art and methodology of aging liquids in wooden containers has been gradually improved upon since the appearance of the first barrel. Each attempt at improvement has focused on only a small spectrum of the overall process. With technical advancements in fabrication techniques, as well as a better understanding of the science behind the aging process, it is now possible to truly improve upon the overall design for wooden containers meant for aging.

SUMMARY

This vessel's targeted audiences are those who seek to impart the qualities of oak, or other types of wood, into their liquid products, such as wine and spirits, through the process of aging. As a beverage maker, the ability to conserve liquid product, create a unique taste, increase production rate, conserve storage space during the aging process, and maintain a financial advantage are all key elements to the success of their business. This vessel's unmatched ability to overcome a wide range of challenges is what sets it apart from the previously proposed arts.

The primary goal of this vessel is to offer a comprehensive solution to the food/beverage industry as well as the household entrepreneur affording them the ability to maximize their production with an accelerated, simple, reliable, and cost effective method for aging liquids in a wooden vessel. For several decades, the oak barrel has been the only means for aging liquids within wooden containers. While the oak barrel offers many advantages (such as internal volume or durability), its ability to accommodate all the modern-day demands is lacking.

The driving objectives behind this uniquely designed vessel are to decrease the product's aging period, increase the product's concentration (via increased internal surface area to volume ratio of the vessel), reduce the amount of liquid product required by the beverage maker, maintain the integrity of the vessel, conserve storage space while the product is aging, ease of fabrication/assembly, and lower the cost to distribute these vessels. While other proposals have claimed to solve these concerns, their solutions did not completely address the problem or inadvertently hindered other aspects of the overall design.

BRIEF DESCRIPTION OF THE DRAWINGS

FIG. 8 is an isometric view of the vessel with a bottom and side member hidden for clarity.

FIG. 9 is a side view of the vessel with a side member hidden for clarity.

DESCRIPTION

This design combines the ease of fabrication and assembly with the latest techniques for aging liquids in a wooden vessel.

Figure 6:
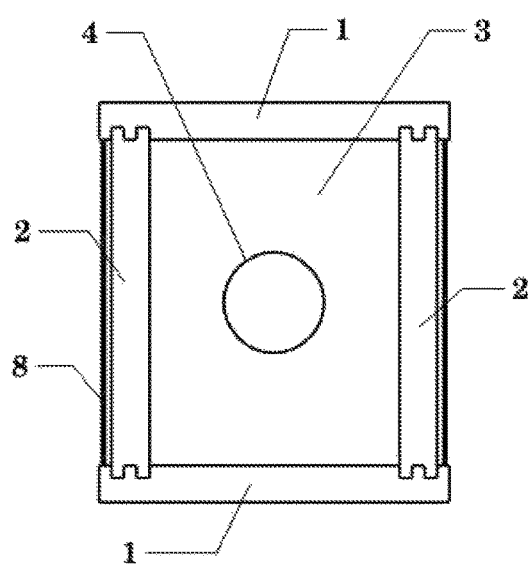
FIG. 6 is a top view of the assembled vessel.
Figure 7:
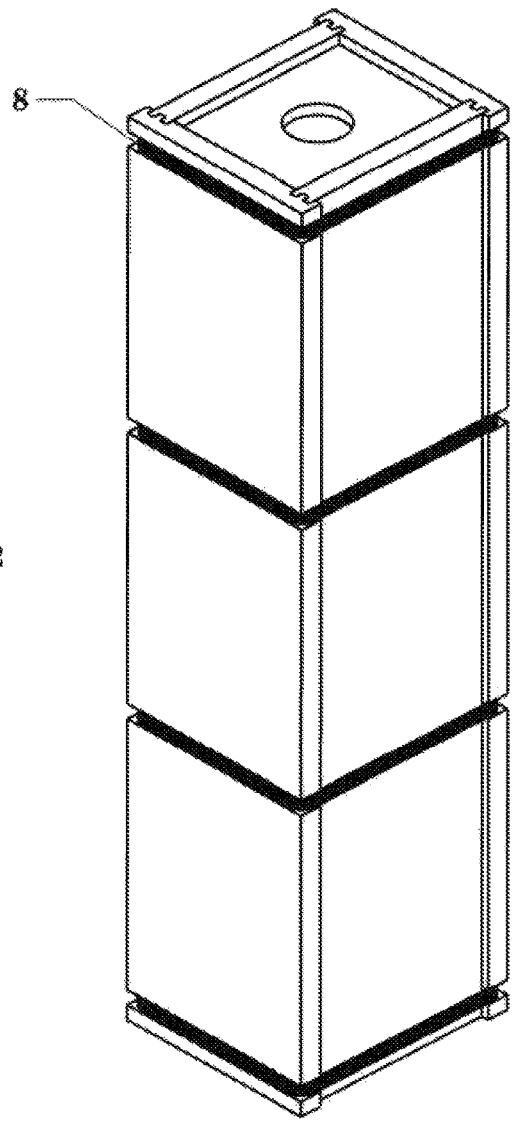
FIG. 7 is an isometric view of the assembled vessel

This rectangular vessel is constructed from solid wood (generally oak) and consists of 6 sides (i.e. members)—A top/bottom (1), two sides (2), and two head plates (3). To simplify the fabrication of the vessel, the top and bottom members are identical, the two side members are identical, and the two head plates are identical. Dimensionally the head plates are identical, but one head plate has a hole in its center to act as the bunghole (4). A "croze" is formed at both ends of the vessel by the grooves (6) cut into the top, bottom, and side members. The head plates fit within this "croze" once all members are assembled (FIG. 6). The vessel is bound around the exterior grooves (7) with cord or other mechanical means (8) to further secure and compress the sealing surfaces of the vessel. No adhesives or metallic fasteners are used to assemble this vessel to preserve the oaks integrity and protect the liquid product.

Figure 3:
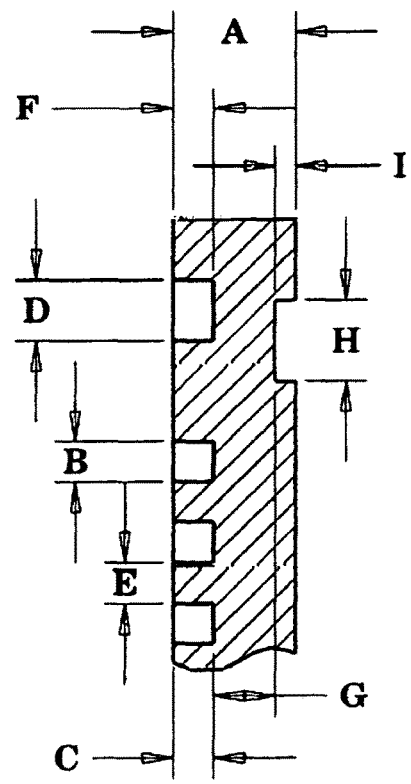
FIG. 3 is a detailed view of FIG. 2A
Figure 5:
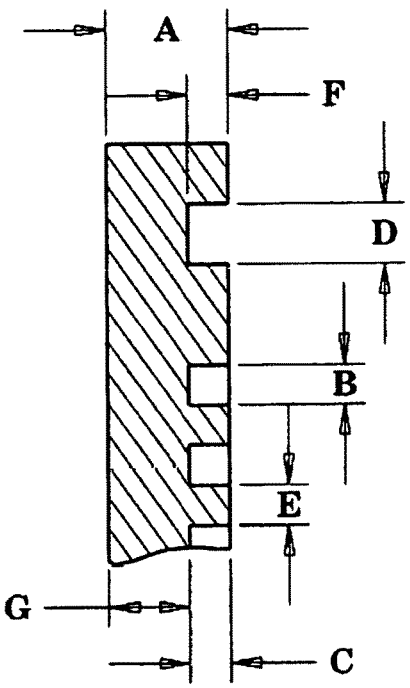
FIG. 5 is a detailed view of FIG. 4A.

From FIG. 3 and FIG. 5, the depth of the cross grain cut (C) and the depth of the "croze" groove (F) should not exceed 40% of the overall thickness of the member (A) to ensure the vessel remains integral. In addition, the height of the cross grain cut (B) should be tall enough to allow liquid to completely fill the void. Furthermore, the distance between cross grain cuts (E) should be at least twice the penetration depth of liquid into the oak. If this dimension (E) becomes too small, a false representation of surface area will be calculated due to over-saturation. The "croze" height (D) should be the exact thickness of the head plates to form a liquid-tight seal. Specific to FIG. 3, the exterior groove height (H) and depth (I) should be large enough to conceal the means of compression within the exterior envelope of the vessel. It should be noted that the minimum vessel thickness (G) should not be less than 2.5 times the liquid penetration depth into the wood.

Figure 1:
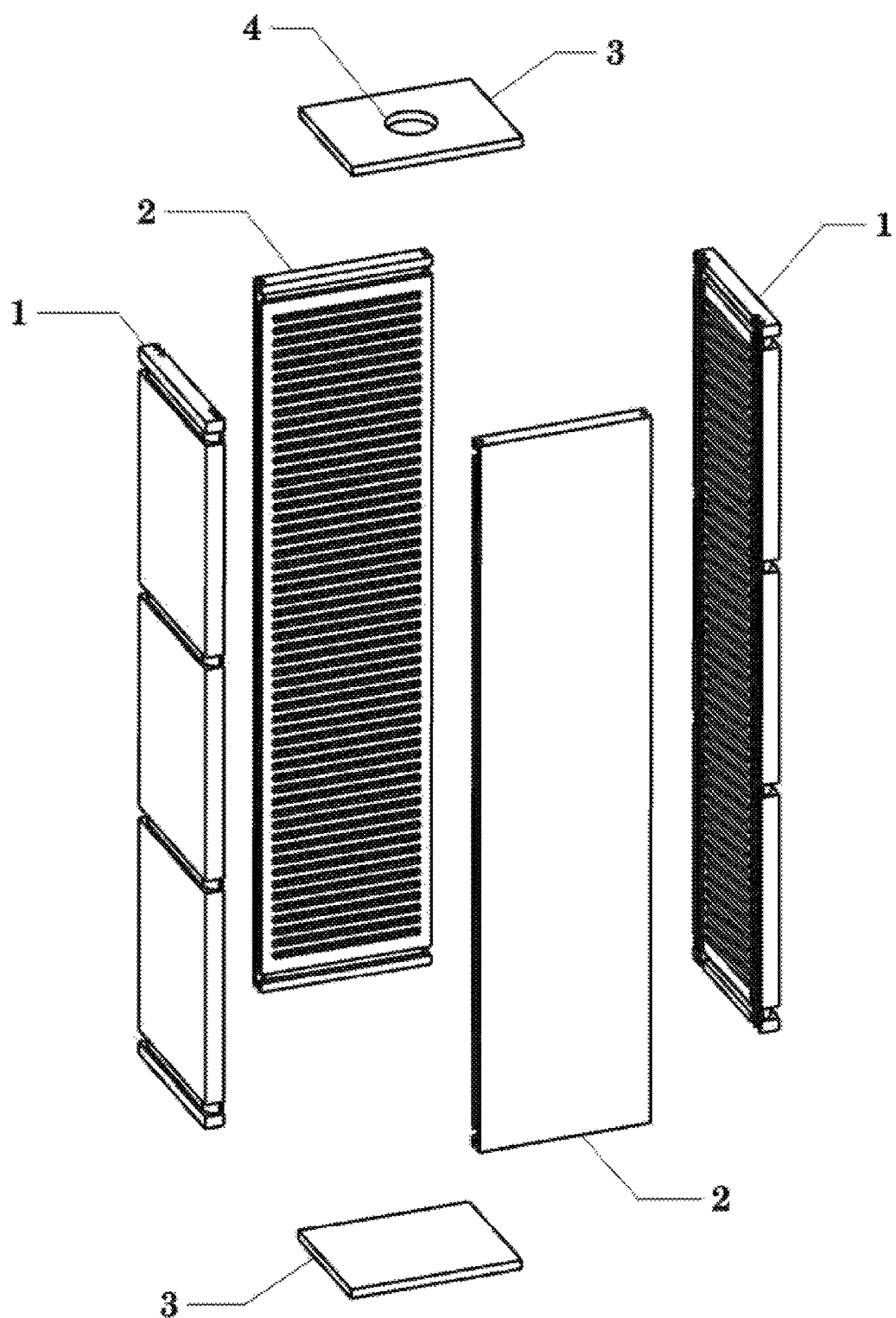
FIG. 1 is an exploded view of the 6 members that comprise this vessel.
Figure 2:
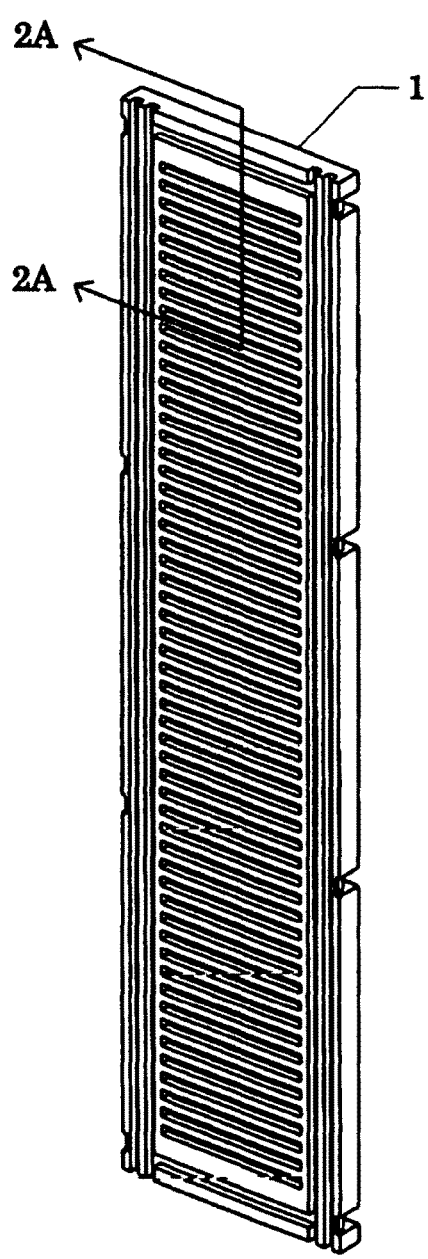
FIG. 2 is an isometric view of a top/bottom member.
Figure 2A:
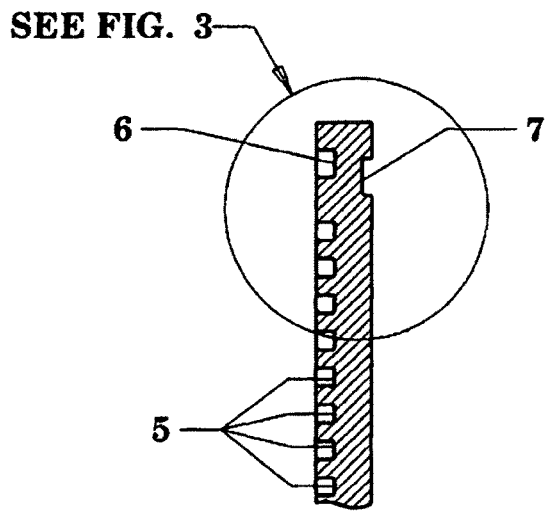
FIG. 2A is a cross section view taken from line 2A of FIG. 2.
Figure 4:
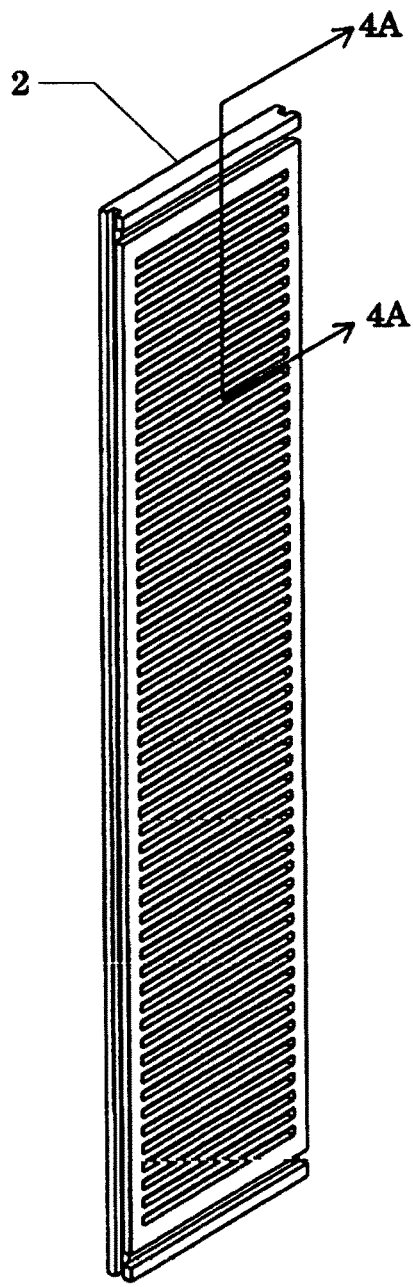
FIG. 4 is an isometric view of a side member.
Figure 4A:
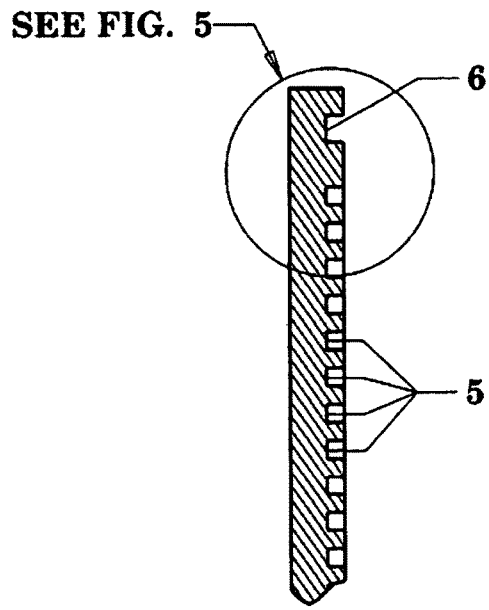
FIG. 4A is a cross section view taken from line 4A of FIG. 4.

The proposal to increasing internal surface area by making cross grain cuts is not a new concept. The essential difference that distinguishes this design is that this vessel's integrity has not been compromised by the addition of these cross grain cuts. Other arts have proposed to cut the inside of a standard oak barrel to achieve this increased surface area. The standard oak barrel is comprised of many wooden staves that rely on compression to their neighboring stave to form its liquid-tight seal. If cross grain cuts are made to these staves, the critical sealing surface between staves is decreased and therefore compromises the barrel's ability to remain liquid-tight. In addition, staves are subject to a harsh forming process while shaping the curvature of a barrel. By removing material from a stave, the structural integrity of the barrel has been weakened. This vessel's design has cross cuts that do not encroach upon any sealing surfaces (FIG. 2 and FIG. 4) allowing this vessel to maintain the highest level of integrity while increasing its internal surface area.

The vessel's inner surfaces (except the head plates) have series of cross grain cuts (5). Each cut into the face grain exposes two end grain surfaces and increases the overall internal surface area of the vessel. The ability to decrease the necessary aging period is directly related to the amount of surface area, but more importantly, the amount of end grain exposure. Since "the speed of liquid penetration into wood is a limitation factor for the extraction of wood compounds"[1], the faster the liquid product can penetrate the wood, the less time is required to fully age the product. The liquid penetration rate into end grain is substantially faster than the penetration rate into face grain. This is due to end grain surfaces exposing the wood's vascular openings which were once used to transport water through the living tree. Therefore, if a vessel has maximized its end grain exposure while remaining economical to manufacture, a beverage maker could move product quicker and more efficiently.

Another factor that contributes to the decreased aging period is a container's surface area to volume ratio. As mentioned above, previous proposals have modified the inner surface of standard oak barrels to increase their surface area. However, with a standard barrel (depending upon the type of barrel) holding approximately 60 gallons, it is difficult to increase this crucial ratio when dealing with such large volumes. By decreasing the internal volume and maximizing the amount of surface area, this vessel is able to achieve a surface area to volume ratio that is over 30 times greater than a standard barrel's ratio. Therefore a beverage maker could age 6 gallons of product at 10 times the concentration of wood extractions (i.e. 10 times the surface are to volume ratio) and have the equivalent of 60 gallons of "normally age" product. This would save the beverage maker 54 gallons of product.

Previously proposed methods have suggested the addition of wood chips, complex apparatuses, or "tea bags" to increase the surface area to volume ratio within a barrel. The disadvantages of these methods include an unknown amount of surface area that has been added to the liquid, the cost of manufacturing a complex insert, or the addition of non-oak material entering the container which could negatively impact the liquid product. This vessel's solid wood planks can be quickly and easily fabricated to maximize the end grain surface added to the vessel. In addition, by adding a known amount of planks to this vessel (which would decreases the internal volume), a simple calculation can be made to determine the new surface area to volume ratio.

A unique customization feature of this vessel is its ability to meet the beverage maker's specific requirements for concentration of their product. Additional surface area can be added in the form of end grain planks (9) installed within the side member's (2) cross grain cuts (5). Due to the side members being identically fabricated, flat planks fit in a secured position parallel to the head plates. Since the grooves do not consume the entire cross-section of the vessel, the maximum number of plates can be installed without restricting the vessel's ability to be filled or drained completely (FIG. 9). To further customize this vessel, the internal surfaces as well as the additional planks can be toasted or charred to the end users specifications to enhance the color and flavor the liquid product.

Due to this simplistic design, assembly does not have to occur at the vessel's place of fabrication. Unlike a standard oak barrel where up to 30 perfectly matched staves must be artistically shaped and assembled, this vessel's 6 members can be assembled with little effort or instructional guide. This vessel can be distributed to its destination disassembled, saving on shipping costs, and the end user can assemble the vessel with minimal complications. In addition, by assembling only 6 members opposed to the standard oak barrel's 30 staves, the number of potential leaks due to a mismatched sealing surface is drastically reduced.

At the beverage maker's facility, available storage area while aging their product will always be a concern. If a standard oak barrel is being used to age their product (depending upon the type of barrel), approximately 14.77 ft$^3$ of storage space will be consumed. The cylindrical geometry of a standard barrel bears the disadvantage of unutilized space when stacked. However, with this vessel's geometry being that of a rectangular prism, multiple vessels can be stored together without wasted space. With outer dimension of 7"×8"×30" and an inner volume of slightly over 4 gallons, 15 vessels can be put together occupying 14.58 ft$^3$ (0.19 ft$^3$ less than a standard barrel) and contain a similar volume of product.

REFERENCES CITED

U.S. Patent Documents

| | | |
|---|---|---|
| 1,200,581 | October 1916 | Brown |
| 1,890,597 | December 1932 | Bishop |
| 1,978,811 | October 1934 | Muller |
| 2,079,378 | May 1937 | Mills |
| 2,105,693 | January 1938 | Jones et al. |
| 2,289,245 | July 1942 | Dant |
| 2,649,124 | August 1953 | Merron |
| 3,106,885 | October 1963 | Kelley |
| 3,372,633 | March 1968 | Horlander, Jr. |
| 3,842,723 | October 1974 | Boucher |
| 4,093,099 | June 1978 | Spooner |
| 4,998,643 | March 1991 | Pradel |
| 5,174,461 | December 1992 | Sullivan |
| 5,537,913 | July 1996 | Vowles |
| D476058 | June 2003 | Norton |
| 7,762,179 | July 2010 | Eustis |
| 8,381,926 | February 2013 | Kenealy et al. |
| 8,689,678 | April 2014 | Eustis |
| 9,032,864 | May 2015 | Roleder |
| 9,212,343 | December 2015 | Karasch et al. |

OTHER REFERENCES

[1] http://www.practicalwinery.com/winter2013/staves1.htm

The invention claimed is:

1. A six-sided rectangular wooden vessel formed from three pairs of identical wooden members for the aging of liquid by which to impart wooden characteristics into said liquid comprising, in combination,
   a) an identical top and bottom pair of rectangular wooden members having an overall length of approximately 30 inches, a width of approximately 7 inches, and planed inner and outer surfaces to a dimensional thickness of approximately 1 inch,
      i. having two sets of double grooves which run the length of said inner surface with each set of said double grooves spaced approximately ¼ inch from each edge,
      ii. said inner surface having a croze groove cut to the same depth as said double groove at either longitudinal end of said top and bottom member connecting the innermost grooves of said double groove,
      iii. said inner surface having a series of approximately ¼-inch wide and ¼-inch deep cross grain cuts running perpendicular to said double grooves bounded by said croze grooves and the inner-most groove of said double groove,
      iv. shallow grooves, approximately one every ten inches, cut from said outer surface wrapping to each adjacent edge of said top and bottom members,
   b) an identical side pair of rectangular wooden members which are in equal length to said top and bottom members, a width of approximately 6 inches, and planed inner and outer surfaces to a dimensional thickness of approximately ¾ inch,
      i. said inner surface having equally spaced croze grooves matching that of said top and bottom members cut at either longitudinal end and spanning the entire width of said side member,
   ii. said inner surface having a series of approximately ¼-inch wide and ¼-inch deep cross grain cuts running perpendicular to the length of said side member bounded between said croze grooves and spaced approximately ½-inch away from each edge of said side members,
   iii. having a double tongue cut into both longitudinal edges of said side members which complement the double grooves of said top and bottom member,
c) an identical pair of wooden head plate members which mate within the croze grooves of said top, bottom, and side members, wherein,
   i. one head plate will have a through-hole for filling the vessel.

2. A six-sided rectangular wooden vessel, as in claim 1, in which when assembled and banded together will interlock all wooden members forming a liquid-tight union.

3. A six-sided rectangular wooden vessel, as in claim 1, in which will accelerate the impartment of wooden qualities into the liquid contents.

\* \* \* \* \*